3,258,443
LATICES FOR ADHESIVES OF TERPOLYMER OF ACETATE-ACRYLATE-CARBOXYLIC ACID OR DERIVATIVE
Harry A. Cantor, Plainfield, William B. Horback, Irvington, Joseph A. Vona, Westfield, and Edward J. Kuczynski, Bayonne, N.J., assignors to Celanese Corporation of America, New York, N.Y., a corporation of Delaware
No Drawing. Filed July 13, 1961, Ser. No. 123,658
14 Claims. (Cl. 260—29.6)

This invention relates to improved synthetic latices, i.e. aqueous dispersions of synthetic polymers. The invention further relates to synthetic latices particularly useful for the production of pressure sensitive adhesives.

A pressure sensitive adhesive is a material capable of bonding two surfaces at room temperature by means of moderate pressure, i.e. without the necessity of heat, high pressures and/or solvent treatment. While many materials have been proposed as pressure sensitive adhesives, these materials often are deficient in one or more of the properties important in such an adhesive, e.g. adhesion or the ability to stick to other materials such as the surfaces to be bonded, cohesion or internal strength which is the ability to withstand normal stress without splitting internally and elasticity to which is related the ability of the bond to be separated without excessive jerkiness. Furthermore, it is necessary to apply many of these materials in the form of a solution in an organic solvent. Such solvent is often expensive, inflammable and presents various handling difficulties both in the preparation of the solution and its application to a surface such as the backing of an adhesive tape.

It is an object of this invention to provide improved synthetic latices. It is a further object of this invention to provide synthetic latices which are particularly useful in the formation of pressure sensitive adhesives. It is a still further object of this invention to provide compositions which may be prepared, and from which may be deposited pressure sensitive adhesives, without the necessity of organic solvents. Other objects will be apparent from the following detailed description and claims.

In accordance with one aspect of the invention, a latex is prepared based on a normally tacky polymer of 1 to 45% of vinyl acetate, 50 to 98% of an alkyl acrylate capable of being homopolymerized to normally tacky polymer, e.g. one in which the alkyl group contains at least 4 carbon atoms and preferably no more than 10 carbon atoms, and 1 to 5% of at least one mono-ethylenically unsaturated carboxylic acid, an anhydride or nitrile of such an acid, or mixtures thereof, the percentages based on the total weight of monomers. The copolymer preferably contains 5 to 24% of vinyl acetate units, 75 to 94% of alkyl acrylate units and 1 to 2.5% of unsaturated acid, anhydride and/or nitrile units, the percentages being based on the weight of the copolymer.

In addition to monomers from the above three classes which must be present, minor amounts of other comonomers may also be used, e.g. in an amount up to 5% based on the total weight of monomers. Such comonomers are, for example, methyl methacrylate and styrene.

In addition to the dispersed copolymer, the latices of this invention may also contain at least one surface-active agent which is preferably non-ionic. Some non-ionic surface-active agents which may be used are condensation products of an alkyl phenol and ethylene oxide containing 8 to 9 carbon atoms in the alkyl group and 20 to 100 oxyethylene groups, and condensation products of a fatty alcohol and ethylene oxide having from 12 to 18 carbon atoms in the fatty alcohol chain and 20 to 100 oxyethylene groups. Mixtures of surface-active agents may be used. The non-ionic surface active agent when used as the sole surface active agent may be present for example, in the range of 0.5 to 10% preferably 0.5 to 8% by weight of the monomers.

In some instances, it may be desirable to use an anionic surface active agent together with or in place of the non-ionic agent. Some anionic surface active agents which may be used are, for example, a sodium sulfonate e.g. a sodium alkyl aryl sulfonate in which the alkyl groups contains 1 to 20 carbon atoms such as sodium dodecyl phenyl sulfate ("Santomerse No. 3"), sodium salts of alkyl sulfates (oleyl sodium sulfate, lauryl sodium sulfate), sodium salts of sulfated and sulfonated amides and amines (sodium N-methyl-N-palmitoyl tauride such as "Igepon TN74"), sodium salts of sulfated and sulfonated esters and ethers (sodium octyl sulfosuccinate such as "Aerosol OT") and sodium salts of alkyl sulfonates (sodium lauryl sulfonate such as, "Duponol 189"). In general the total amount of surface active agents of all types may be within the ranges set out above for the non-ionic agent.

The latices of this invention are preferably prepared by polymerizing the monomers in the presence of the emulsifying surface active agent which is present in the finished latex. The polymerization medium preferably also contains 0.05 to 0.5% by weight of an alkaline material, e.g. sodium acetate to control the pH during the polymerization.

The alkyl acrylate employed in the copolymer may be, for example, 2-ethylhexyl acrylate, iso-octyl acrylate and n-hexyl acrylate. The alkyl group of the alkyl acrylate preferably contains at least six straight chain carbon atoms. The most preferred alkyl acrylate is 2-ethylhexyl acrylate.

The monoethylenically unsaturated carboxylic acid, anhydride or nitrile of the copolymer is preferably one containing no more than 6 open chain carbon atoms and having its ethylenic bond on an alpha carbon atom relative to a carboxyl or nitrile group. The compound may be, for example, acrylic acid, methacrylic acid, itaconic acid, maleic acid, maleic anhydride, crotonic acid or acrylonitrile. More than one of these compounds, e.g. acrylic acid and acrylonitrile may also be used.

The percentage of polymer in the latex after polymerization in many cases is fairly high, e.g. 30 to 60%, preferably 40 to 55% by weight of the latex.

In preparing the latex, the monomeric material and a free radical yielding catalyst are preferably added to a solution of the surface active agent at a suitable polymerization temperature e.g. 25 to 80° C. preferably 50 to 70° C. The reaction may, in general be carried out at atmospheric pressure, although the pressure may be varied from atmospheric on some instances. Some suitable catalysts are peroxide compounds such as hydrogen peroxide, either alone or in combination with other agents such as an iron salt, zinc formaldehyde sulfoxylate or a titanous salt, alkali metal persulfates such as potassium persulfate, and redox systems such a potassium persulfate and sodium bisulfite, ammonium persulfate and sodium metabisulfite, a bromate mixed with a bisulfite etc. The proportion of catalyst may be varied widely, one suitable range being 0.01% to 3% preferably 0.05% to 0.5% by weight of the composition.

Latices having particularly desirable properties are obtained if the monomers of the copolymer are emulsion polymerized in the presence of a non-ionic surface-active agent, e.g. the agent present in the final composition. Preferably, the non-ionic agent is a condensation product of an octyl or nonyl phenol and ethylene oxide and containing from about 20 to about 100 ethylene oxide units per unit of octyl or nonyl phenol.

The polymer particles in the latices of this invention are generally of fairly small size. Most of the particles are in the range of 0.1 to 2.0 microns, often in the range of 0.4 to 0.7 microns.

The latices of this invention may be used to deposit a pressure sensitive adhesive coating on, and to bond, a wide variety of surfaces. Thus pressure sensitive adhesive tapes, e.g. masking, mending, sealing and surgical tapes, may be prepared by depositing a coating of the latex on any of various flexible backings and allowing it to dry. The flexible backing may be, for example a non-porous film, e.g. composed of cellophane, cellulose acetate, cellulose propionate, polyethylene terephthalate and other polyesters, nylons such as polyhexamethylene adipamide and polycaprolactam, polyethylene, polypropylene, polyvinylidene chloride, a high vinylidene chloride copolymer, etc., or a porous backing such as paper or a fabric. In addition, the latex may be applied as a seal coating for containers such as paper bags and cartons.

The following example further illustrates the invention. All parts are by weight.

*Example I*

A solution of 22.4 parts of "Igepal CO-970" (a condensation product of nonyl phenol and ethylene oxide containing about 97% by weight of oxyethylene units) and 1 part of sodium acetate buffer in 455 parts of water was prepared at room temperature with stirring. Oxygen was excluded from the vapor space of the reaction vessel by flushing with nitrogen. To the vessel were added 0.9 part of sodium metabisulfite dissolved in 10 parts water and 0.45 part of ammonium persulfate dissolved in 10 parts water, and 83.6 parts of vinyl acetate, 352 parts of 2-ethylhexyl acrylate and 4.4 parts of acrylic acid were copolymerized over about a 4 hour period. The reaction was allowed to proceed on its own exotherm for about ¼ hour, was heated to and maintained at a temperature of 60–65° C. by means of a hot water bath for a period of about 2 hours, was heated to 75° C. over a period of about ¾ hour, and was maintained at a temperature of 75° C. for a period of about 1 hour. During the polymerization additional ammonium persulfate in an amount of 0.45 part dissolved in 40 parts water was added to the vessel. The mass was then cooled to room temperature.

A stable dispersion was obtained in a yield of about 97% and containing 46% by weight of solids.

*Example II*

The procedure of Example I was repeated except that the non-ionic surface active agent consisted of 1.32 parts of "Igepal CO-890" (a condensation product of ethylene oxide and nonyl phenol in a molar ratio of about 40 to 1), and 1.89 parts of "Igepal CO-977" (a condensation product of ethylene oxide and nonyl phenol in a molar ratio of about 50 to 1), the ammonium persulfate was added in an amount of 0.5 part initially and 0.5 part during the reaction, and the monomers polymerized consisted of 35.24 parts of 2-ethylhexyl acrylate, 7.93 parts of vinyl acetate, and 0.88 part of acrylic acid.

The product was a stable dispersion containing 46% by weight of solids.

The compositions of Examples I and II yielded excellent pressure sensitive adhesive tapes when coated on flexible backings such as polyethylene terephthalate film, cellophane or cellulose acetate film, and dried.

It is to be understood that the foregoing detailed description is merely given by way of illustration and that many variations may be made in the invention without departing from the spirit thereof.

Having described our invention, what we desire to secure by Letters Patent is:

1. A latex comprising an aqueous dispersion of a copolymer of 1 to 45% of vinyl acetate, 50 to 98% of an alkyl acrylate in which the alkyl group contains at least 4 carbon atoms and 1 to 5% of a member of the group consisting of monoethylenically unsaturated carboxylic acids, anhydrides and nitriles of such acids and mixtures thereof, said percentages based on the total weight of monomers.

2. A latex comprising an aqueous dispersion of a copolymer of 1 to 45% of vinyl acetate, 50 to 98% of 2-ethylhexyl acrylate, and 1 to 5% of acrylic acid, said percentages based on the total weight of monomers.

3. A latex comprising an aqueous dispersion of a copolymer of 5 to 24% of vinyl acetate, 75 to 94% of 2-ethylhexyl acrylate, and 1 to 2.5% of acrylic acid, said percentages based on the total weight of monomers.

4. The latex of claim 1 containing as a non-anionic surface active agent a polyoxyethylated alkyl phenol in which the alkyl group contains 8 to 9 carbon atoms in which there are 20 to 100 oxyethylene units per phenolic unit.

5. The latex of claim 2 containing as a non-anionic surface active agent a polyoxyethylated alkyl phenol in which the alkyl group contains 8 to 9 carbon atoms in which there are 20 to 100 oxyethylene units per phenolic unit.

6. The latex of claim 3 containing as a non-anionic surface active agent a polyoxyethylated alkyl phenol in which the alkyl group contains 8 to 9 carbon atoms in which there are 20 to 100 oxyethylene units per phenolic unit.

7. A process comprising dispersing 1 to 45% of vinyl acetate 50 to 98% of an alkyl acrylate in which the alkyl group contains 4 to 10 carbon atoms, and 1 to 5% of a member of the group consisting of monoethylenically unsaturated carboxylic acids, anhydrides and nitriles of such acids, and mixtures thereof, based on the total weight of monomers, and polymerizing said compounds with the aid of a free radical yielding catalyst.

8. A process comprising dispersing 5 to 24% of vinyl acetate, 75 to 94% of 2-ethylhexyl acrylate, and 1 to 2.5% of acrylic acid in water said percentages based on the total weight of monomers, and polymerizing said compounds with the aid of a free radical yielding catalyst.

9. The process of claim 7 in which said water contains dissolved therein a polyoxyethylated alkyl phenol in which the alkyl group contains 8 to 9 carbon atoms and which contains 20 to 100 oxyethylene groups per phenolic unit.

10. The process of claim 8 in which said water contains dissolved therein a polyoxyethylated alkyl phenol in which the alkyl group contains 8 to 9 carbon atoms and which contains 20 to 100 oxyethylene groups per phenolic unit.

11. A copolymer of 1 to 45% of vinyl acetate, 50 to 98% of an alkyl acrylate in which the alkyl groups contain at least 4 carbon atoms, and 1 to 5% of a member of the group consisting of monoethylenically unsaturated carboxylic acids, anhydrides and nitriles of such acids and mixtures thereof, said percentages based on the total weight of the monomers.

12. A copolymer of 5 to 24% of vinyl acetate, 75 to 94% of 2-ethylhexyl acrylate and 1 to 2.5% of acrylic acid, said percentages based on the total weight of monomers.

13. A pressure sensitive adhesive tape comprising a flexible backing coated with the copolymer of claim 11.

14. A pressure of sensitive adhesive tape comprising a flexible backing coated with the copolymer of claim 12.

References Cited by the Examiner

UNITED STATES PATENTS

| | | | |
|---|---|---|---|
| 2,570,253 | 10/1951 | Lundquist | 260—29.6 |
| 2,845,398 | 7/1958 | Brown et al. | 260—29.6 |
| 2,892,802 | 6/1959 | Budewitz | 260—29.6 |
| 2,956,973 | 10/1960 | Holdsworth | 260—29.6 |

MURRAY TILLMAN, *Primary Examiner.*

L. J. BERCOVITZ, *Examiner.*

J. ZIEGLER, H. L. SATZ, *Assistant Examiners.*